United States Patent
Phillips et al.

(10) Patent No.: US 11,388,208 B2
(45) Date of Patent: Jul. 12, 2022

(54) VIRTUAL AGENT COMMUNICATION FOR ELECTRONIC DEVICE

(71) Applicant: Nuance Communications, Inc., Burlington, MA (US)

(72) Inventors: Michael Stuart Phillips, Belmont, MA (US); John Nguyen, Arlington, MA (US); Thomas Jay Leonard, Boston, MA (US); David Grannan, Newton, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 17/229,938

(22) Filed: Apr. 14, 2021

(65) Prior Publication Data

US 2021/0306388 A1    Sep. 30, 2021

Related U.S. Application Data

(63) Continuation of application No. 16/212,826, filed on Dec. 7, 2018, now Pat. No. 10,999,335, which is a
(Continued)

(51) Int. Cl.
*H04L 29/06* (2006.01)
*G06Q 10/10* (2012.01)
(Continued)

(52) U.S. Cl.
CPC .......... *H04L 65/403* (2013.01); *G06Q 10/10* (2013.01); *H04L 67/141* (2013.01); *H04W 4/00* (2013.01); *H04L 67/18* (2013.01)

(58) Field of Classification Search
CPC ..... H04L 65/403; H04L 67/141; G06Q 10/10; H04W 4/00
See application file for complete search history.

(56) References Cited

U.S. PATENT DOCUMENTS

| 5,911,129 A | 6/1999 | Towell |
| 6,298,348 B1 | 10/2001 | Eldering |

(Continued)

FOREIGN PATENT DOCUMENTS

| CN | 1971604 A | 5/2007 |
| CN | 101305340 A | 11/2008 |

(Continued)

OTHER PUBLICATIONS

U.S. Appl. No. 13/710,649, filed Dec. 11, 2012, Lynch et al.
(Continued)

*Primary Examiner* — Christopher B Robinson

(57) ABSTRACT

Methods and apparatus for communicating between virtual agents associated with users of electronic devices connected via at least one network. A first user may instruct an associated first virtual agent to invoke a communication session with a second virtual agent associated with a second user. To invoke the communication session, the first virtual agent may send an outgoing communication to the second virtual agent and the outgoing communication may instruct the second virtual agent to perform at least one action on behalf of the first user. Virtual agents associated with different users may alternatively communicate with each other in the absence of user interaction to perform a collaborative action.

20 Claims, 6 Drawing Sheets

Related U.S. Application Data continuation of application No. 13/963,316, filed on Aug. 9, 2013, now Pat. No. 10,154,070.

(60) Provisional application No. 61/682,061, filed on Aug. 10, 2012.

(51) Int. Cl.
*H04L 29/08* (2006.01)
*H04W 4/00* (2018.01)
*H04L 65/403* (2022.01)
*H04L 67/141* (2022.01)
*H04L 67/52* (2022.01)

(56) References Cited

U.S. PATENT DOCUMENTS

| | | |
|---|---|---|
| 6,466,654 B1 | 10/2002 | Cooper et al. |
| 6,493,428 B1 | 12/2002 | Hillier |
| 6,598,018 B1 | 7/2003 | Junqua |
| 6,804,668 B1 | 10/2004 | Shambaugh et al. |
| 6,853,716 B1 | 2/2005 | Shaffer |
| 6,920,425 B1 | 6/2005 | Will et al. |
| 7,062,510 B1 | 6/2006 | Eldering |
| 7,286,990 B1 | 10/2007 | Edmonds et al. |
| 7,415,100 B2 | 8/2008 | Cooper et al. |
| 7,450,567 B1 | 11/2008 | Mamnani |
| 8,000,454 B1 | 8/2011 | Or-Bach et al. |
| 8,204,184 B2 | 6/2012 | Gao et al. |
| 8,239,366 B2 | 8/2012 | Sejnoha et al. |
| 8,489,399 B2 | 7/2013 | Gross |
| 8,566,394 B2 | 10/2013 | Wang et al. |
| 8,705,363 B2 | 4/2014 | Lynch et al. |
| 8,787,553 B2 | 7/2014 | Fan et al. |
| 8,850,569 B1 | 9/2014 | Huang et al. |
| 8,930,815 B2 | 1/2015 | Moore |
| 8,972,268 B2 | 3/2015 | Waibel et al. |
| 9,076,448 B2 | 7/2015 | Bennett et al. |
| 9,117,451 B2 | 8/2015 | Fructuoso et al. |
| 9,148,394 B2 | 9/2015 | Lynch et al. |
| 9,183,843 B2 | 11/2015 | Fanty et al. |
| 9,262,175 B2 | 2/2016 | Lynch et al. |
| 9,276,802 B2 | 3/2016 | Lynch et al. |
| 9,479,931 B2 | 10/2016 | Ortiz et al. |
| 9,560,089 B2 | 1/2017 | Lynch et al. |
| 9,571,645 B2 | 2/2017 | Quast et al. |
| 9,659,298 B2 | 5/2017 | Lynch et al. |
| 9,679,300 B2 | 6/2017 | Lynch et al. |
| 9,804,820 B2 | 10/2017 | Quast et al. |
| 10,154,070 B2 * | 12/2018 | Phillips .................. H04W 4/00 |
| 10,534,623 B2 | 1/2020 | Haper et al. |
| 10,999,335 B2 | 5/2021 | Phillips et al. |
| 2001/0033298 A1 | 10/2001 | Slotznick |
| 2002/0143533 A1 | 10/2002 | Lucas et al. |
| 2003/0149758 A1 | 8/2003 | Riche et al. |
| 2003/0163311 A1 | 8/2003 | Gong |
| 2003/0167167 A1 | 9/2003 | Gong |
| 2003/0191689 A1 | 10/2003 | Bosarge et al. |
| 2004/0023666 A1 | 2/2004 | Moon et al. |
| 2004/0064704 A1 * | 4/2004 | Rahman .................. G06F 16/51 707/E17.031 |
| 2004/0088162 A1 | 5/2004 | He et al. |
| 2004/0225650 A1 | 11/2004 | Cooper et al. |
| 2005/0021330 A1 | 1/2005 | Mano |
| 2005/0114191 A1 | 5/2005 | Atkin et al. |
| 2005/0210395 A1 * | 9/2005 | Wakita .................. G06F 21/6245 715/753 |
| 2005/0223067 A1 | 10/2005 | Buchheit et al. |
| 2006/0064739 A1 * | 3/2006 | Guthrie .................. H04L 51/12 726/3 |
| 2006/0143214 A1 | 6/2006 | Teicher |
| 2006/0168062 A1 | 7/2006 | Herbert et al. |
| 2006/0200435 A1 | 9/2006 | Flinn et al. |
| 2006/0259555 A1 | 11/2006 | Hassounah et al. |
| 2007/0033005 A1 | 2/2007 | Cristo et al. |
| 2007/0043687 A1 | 2/2007 | Bodart et al. |
| 2007/0106514 A1 | 5/2007 | Oh et al. |
| 2007/0214097 A1 | 9/2007 | Parsons et al. |
| 2007/0225984 A1 | 9/2007 | Milstein et al. |
| 2007/0226034 A1 | 9/2007 | Khan |
| 2007/0233635 A1 | 10/2007 | Burfeind et al. |
| 2007/0282621 A1 | 12/2007 | Altman et al. |
| 2008/0043986 A1 | 2/2008 | Darby |
| 2008/0189367 A1 | 8/2008 | Okumura |
| 2008/0201306 A1 | 8/2008 | Cooper et al. |
| 2008/0240379 A1 | 10/2008 | Maislos et al. |
| 2008/0247530 A1 * | 10/2008 | Barton .................. H04M 3/436 379/216.01 |
| 2008/0255852 A1 | 10/2008 | Hu |
| 2009/0018835 A1 | 1/2009 | Cooper et al. |
| 2009/0069913 A1 | 3/2009 | Stefik |
| 2009/0099849 A1 | 4/2009 | Iwasawa |
| 2009/0112782 A1 | 4/2009 | Cross et al. |
| 2009/0144143 A1 | 6/2009 | Iyer |
| 2009/0153493 A1 * | 6/2009 | Mizutani ............. G06F 3/04883 345/173 |
| 2009/0216848 A1 | 8/2009 | Slotznick |
| 2009/0271826 A1 | 10/2009 | Lee et al. |
| 2009/0279683 A1 | 11/2009 | Gisby et al. |
| 2010/0094678 A1 * | 4/2010 | Gupta ................ G06Q 10/1095 705/7.19 |
| 2010/0099385 A1 | 4/2010 | Mousseau |
| 2010/0125592 A1 | 5/2010 | Dauginas et al. |
| 2010/0131996 A1 | 5/2010 | Gauld |
| 2010/0169486 A1 | 7/2010 | McCormack et al. |
| 2010/0174813 A1 | 7/2010 | Hildreth et al. |
| 2010/0226490 A1 | 9/2010 | Schultz et al. |
| 2010/0281427 A1 | 11/2010 | Ghosh et al. |
| 2011/0040756 A1 | 2/2011 | Jones et al. |
| 2011/0066630 A1 | 3/2011 | Balduccini et al. |
| 2011/0141919 A1 | 6/2011 | Singh et al. |
| 2011/0184886 A1 | 7/2011 | Shoham |
| 2011/0184937 A1 | 7/2011 | Jin et al. |
| 2011/0213642 A1 | 9/2011 | Makar et al. |
| 2011/0265179 A1 | 10/2011 | Newman et al. |
| 2011/0289428 A1 | 11/2011 | Yuen et al. |
| 2011/0307253 A1 | 12/2011 | Lloyd et al. |
| 2011/0313803 A1 | 12/2011 | Friend et al. |
| 2012/0010887 A1 | 1/2012 | Boregowda et al. |
| 2012/0011363 A1 * | 1/2012 | Kim ...................... G06Q 10/10 713/168 |
| 2012/0016678 A1 | 1/2012 | Gruber et al. |
| 2012/0059810 A1 | 3/2012 | Sejnoha et al. |
| 2012/0150580 A1 | 6/2012 | Norton |
| 2012/0150598 A1 | 6/2012 | Griggs |
| 2012/0222069 A1 | 8/2012 | Chavez |
| 2012/0239761 A1 | 9/2012 | Linner et al. |
| 2012/0265528 A1 | 10/2012 | Gruber et al. |
| 2012/0278736 A1 | 11/2012 | Tran et al. |
| 2012/0304079 A1 | 11/2012 | Rideout et al. |
| 2013/0006904 A1 | 1/2013 | Horvitz et al. |
| 2013/0031476 A1 | 1/2013 | Coin et al. |
| 2013/0077775 A1 | 3/2013 | Fan et al. |
| 2013/0096813 A1 | 4/2013 | Geffner et al. |
| 2013/0152092 A1 | 6/2013 | Yadgar |
| 2013/0173723 A1 | 7/2013 | Herold et al. |
| 2013/0275164 A1 | 10/2013 | Gruber et al. |
| 2013/0332521 A1 | 12/2013 | Olague et al. |
| 2013/0332839 A1 | 12/2013 | Frazier et al. |
| 2014/0013240 A1 | 1/2014 | Ganesh |
| 2014/0029734 A1 | 1/2014 | Kim et al. |
| 2014/0047001 A1 | 2/2014 | Phillips et al. |
| 2014/0059137 A1 | 2/2014 | Wang et al. |
| 2014/0088961 A1 | 3/2014 | Woodward et al. |
| 2014/0164305 A1 | 6/2014 | Lynch et al. |
| 2014/0164312 A1 | 6/2014 | Lynch et al. |
| 2014/0164317 A1 | 6/2014 | Lynch et al. |
| 2014/0164508 A1 | 6/2014 | Lynch et al. |
| 2014/0164509 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0222569 A1 | 8/2014 | Kerr |
| 2014/0236598 A1 | 8/2014 | Fructuoso et al. |

(56) References Cited

U.S. PATENT DOCUMENTS

| | | |
|---|---|---|
| 2014/0282656 A1 | 9/2014 | Belyaev et al. |
| 2015/0058129 A1 | 2/2015 | Nevid et al. |
| 2015/0088514 A1 | 3/2015 | Typrin |
| 2015/0106394 A1 | 4/2015 | Otto et al. |
| 2015/0154976 A1 | 6/2015 | Mutagi |
| 2015/0169284 A1 | 6/2015 | Harper et al. |
| 2015/0169336 A1 | 6/2015 | Harper et al. |
| 2015/0172262 A1 | 6/2015 | Ortiz et al. |
| 2015/0172463 A1 | 6/2015 | Quast et al. |
| 2015/0186156 A1 | 7/2015 | Brown et al. |
| 2016/0335532 A1 | 11/2016 | Sanghavi et al. |
| 2017/0017501 A1 | 1/2017 | Quast et al. |
| 2019/0109880 A1 | 4/2019 | Phillips et al. |

FOREIGN PATENT DOCUMENTS

| | | |
|---|---|---|
| CN | 101427556 A | 5/2009 |
| CN | 101681491 A | 3/2010 |
| CN | 102017649 A | 4/2011 |
| CN | 102521019 A | 6/2012 |
| CN | 102591912 A | 7/2012 |
| CN | 102750270 A | 10/2012 |
| CN | 102792320 A | 11/2012 |
| CN | 102947844 A | 2/2013 |
| EP | 1202540 A2 | 5/2002 |
| JP | 2006-301972 A | 11/2006 |
| KR | 10-2012-0042006 A | 5/2012 |
| WO | WO 2006/129968 A1 | 12/2006 |
| WO | WO 2011/101527 A1 | 8/2011 |
| WO | WO 2013/184875 A2 | 12/2013 |
| WO | WO 2015/094169 A1 | 6/2015 |

OTHER PUBLICATIONS

U.S. Appl. No. 13/710,678, filed Dec. 11, 2012, Lynch et al.
U.S. Appl. No. 13/710,701, filed Dec. 11, 2012, Lynch et al.
U.S. Appl. No. 13/710,721, filed Dec. 11, 2012, Lynch et al.
U.S. Appl. No. 13/710,897, filed Dec. 11, 2012, Lynch et al.
U.S. Appl. No. 13/710,971, filed Dec. 11, 2012, Lynch et al.
U.S. Appl. No. 13/711,036, filed Dec. 11, 2012, Lynch et al.
U.S. Appl. No. 13/711,069, filed Dec. 11, 2012, Lynch et al.
U.S. Appl. No. 14/107,466, filed Dec. 16, 2013, Ortiz et al.
U.S. Appl. No. 14/107,499, filed Dec. 16, 2013, Quast et al.
U.S. Appl. No. 14/107,545, filed Dec. 16, 2013, Harper et al.
U.S. Appl. No. 14/107,622, filed Dec. 16, 2013, Quast et al.
Chinese Office Action for Chinese Application No. 201380052414.2 dated May 31, 2017.
Extended European Search Report for EP Application No. 13861604.0 dated Apr. 20, 2016.
Extended European Search Report for European Application No. 13827951.8 dated Mar. 14, 2016.
Extended European Search Report for European Application No. 13899976.8 dated May 19, 2017.
International Preliminary Report on Patentability for Application No. PCT/US2013/074121 dated Jun. 25, 2015.
International Search Report and Written Opinion for PCT/US/2013/075457 dated Jul. 29, 2014.
International Search Report and Written Opinion for PCT/US2013/054121 dated Nov. 22, 2013.
International Search Report and Written Opinion for PCT/US2013/074121 dated Mar. 31, 2014.
Burnap et al., Real-Time classification of malicious URLs on Twitter using machine activity data.IEEE/ACM International Conference on Advances in Social Networks Analysis and Mining (ASONAM). 2015:970-7.
Fujita et al., A Method for Analyzing Influence of Emotions of Posts in SNS Conversations. 2013 International Conference on Social Intelligence and Technology. 2013:20-7.
Park et al., A Context Aware DVB Recommendation System Based on Real-Time Adjusted User Profiles.Journal of KIISE. 2010;16(12):1244-8.
Shirehjini, Situation modelling: a domain analysis and user study. 2006 2nd IET International Conference on Intelligent Environments. 2006;2:193-9.
Vourkas et al., Use of ANN and Hjorth parameters in mental-task discrimination. 2000 First International Conference Advances in Medical Signal and Information Processing. 2000:327-32.

\* cited by examiner

VIRTUAL AGENT COMMUNICATION FOR ELECTRONIC DEVICE

RELATED APPLICATIONS

This Application claims the benefit under 35 U.S.C. § 120 as a continuation of U.S. patent application Ser. No. 16/212,826 filed Dec. 7, 2018, titled "VIRTUAL AGENT COMMUNICATION FOR ELECTRONIC DEVICE," which is herein incorporated by reference in its entirety. U.S. patent application Ser. No. 16/212,826 claims the benefit under 35 U.S.C. § 120 as a continuation of U.S. patent application Ser. No. 13/963,316 filed Aug. 9, 2013, titled "VIRTUAL AGENT COMMUNICATION FOR ELECTRONIC DEVICE," now U.S. Pat. No. 10,154,070, which is herein incorporated by reference in its entirety. U.S. Pat. No. 10,154,070 claims the benefit under 35 U.S.C. § 119(e) of U.S. Provisional Application Ser. No. 61/682,061, filed Aug. 10, 2012, titled "VIRTUAL AGENT COMMUNICATION FOR ELECTRONIC DEVICES," which is incorporated by reference in its entirety.

BACKGROUND

In recent years, electronic devices such as smartphones and tablet computers often include applications known as virtual agents or virtual assistants that assist users in performing functions such as searching for content on a network (e.g., the Internet) and interacting with other applications. Users can interact with a virtual agent using typing or touch to perform these functions. Additionally, some devices include a speech interface to enable users to interact with a virtual agent using speech input. These virtual agents are generally platform specific and work with devices that use a particular operating system. For example, the Siri® assistant available from Apple Computers, Inc. is configured to work with devices running the iOS mobile operating system, and the EVA assistant available from Bulletproof Corp. is configured to work with devices running the Android mobile operating system available from Google, Inc.

SUMMARY

Some embodiments are directed to improving the functionality of virtual agents by facilitating communications between virtual agents associated with different users in a networked system. The improved functionality may include, but is not limited to, functions such as finding another user's location, coordinating a meeting place, accessing another user's calendar, scheduling a meeting, and sharing contact information.

Some embodiments are directed to a platform-independent virtual agent that may operate on at least two devices running different operating systems allowing for communication between the at least two devices to perform at least one coordinated action.

Some embodiments are directed to a method of communicating between virtual agents, wherein each of the virtual agents is associated with a user, the method comprising: receiving input from a first user; determining, by a first virtual agent associated with the first user, whether to invoke a communication session with a second virtual agent associated with a second user; and sending an outgoing communication to the second virtual agent in response to determining to invoke the communication session.

Other embodiments are directed to a computer-readable medium encoded with a plurality of instructions that, when executed by at least one computer, perform a method of communicating between virtual agents, wherein each of the virtual agents is associated with a user, the method comprising: receiving input from a first user; determining, by a first virtual agent associated with the first user, whether to invoke a communication session with a second virtual agent associated with a second user; and sending an outgoing communication to the second virtual agent in response to determining to invoke the communication session, wherein the outgoing communication includes a request for the second virtual agent to perform at least one action on behalf of the first user.

Other embodiments are directed to an electronic device, comprising: a communication interface configured to receive input from a first user; and a first virtual agent configured to: determine whether to invoke a communication session with a second virtual agent associated with a second user; and send an outgoing communication to the second virtual agent in response to determining to invoke the communication session, wherein the outgoing communication includes a request for the second virtual agent to perform at least one action on behalf of the first user.

Other embodiments are directed to a method of managing a task by a first virtual agent associated with a first user without receiving input from the first user, the method comprising: determining, by the first virtual agent, whether a condition associated with the task has occurred; and sending an alert to the first user, or an outgoing communication to a second virtual agent associated with a second user in response to determining that the condition has occurred.

Other embodiments are directed to a computer-readable medium encoded with a plurality of instructions that, when executed by at least one computer, perform a method of managing a task by a first virtual agent associated with a first user without receiving input from the first user, the method comprising: determining, by the first virtual agent, whether a condition associated with the task has occurred; and sending an alert to the first user, or an outgoing communication to a second virtual agent associated with a second user in response to determining that the condition has occurred.

Other embodiments are directed to an electronic device, comprising: a first virtual agent associated with a first user, wherein the first virtual agent is configured to: determine whether a condition associated with a task assigned to the first virtual agent has occurred; and send an alert to the first user, or an outgoing communication to a second virtual agent associated with a second user in response to determining that the condition has occurred.

Other embodiments are directed to a method of facilitating communication between virtual agents, wherein each of the virtual agents is associated with a user, the method comprising: receiving by a second virtual agent associated with a second user, a communication from a first virtual agent associated with a first user; and performing at least one action in response to receiving the communication.

Other embodiments are directed to a computer-readable medium encoded with a plurality of instructions that, when executed by at least one computer, perform a method of facilitating communication between virtual agents, wherein each of the virtual agents is associated with a user, the method comprising: receiving by a second virtual agent associated with a second user, a communication from a first virtual agent associated with a first user; and performing at least one action in response to receiving the communication.

Other embodiments are directed to an electronic device, comprising: a communication interface configured to receive a communication from a first virtual agent associated with a first user; and a second virtual agent associated with a second user, wherein the second virtual agent is configured to: perform at least one action in response to receiving the communication.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that although conventional virtual agents are useful for assisting users with various tasks such as initiating a call or searching for content on the world wide web, the functionality of a conventional virtual agent may be improved by enabling a virtual agent associated with one user to interact with virtual agents associated with other users to perform collaborative actions such as finding another user's location, scheduling a meeting with another user, and sharing contact information or other data among users. To this end, some embodiments of the invention are directed at improving the functionality of a virtual agent by enabling agent-to-agent communication to perform one or more actions.

Figure 1:
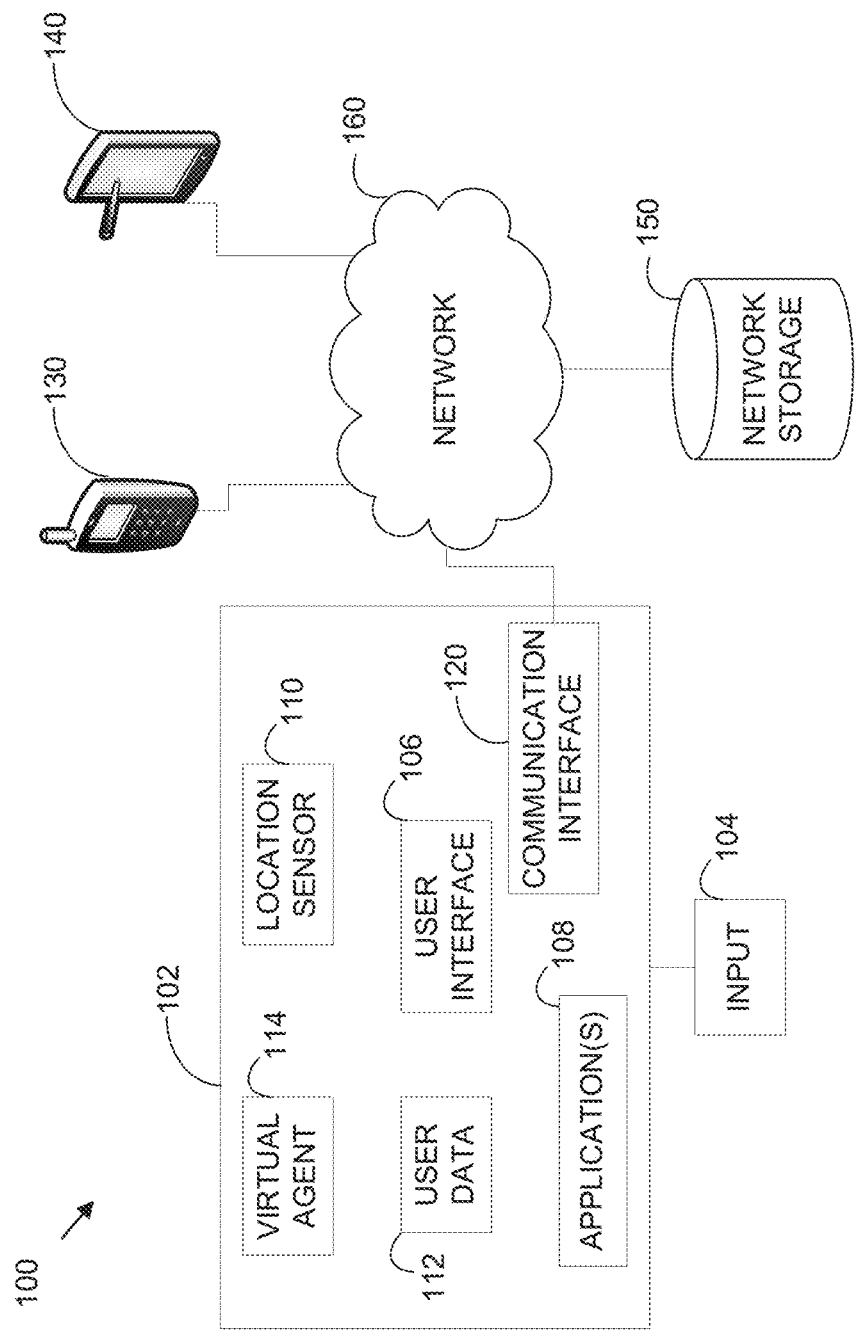
FIG. 1 is an exemplary system including components used to facilitate communication between virtual agents for electronic devices in accordance with some embodiments of the invention.

An exemplary system 100 for use in accordance with some embodiments of the invention is illustrated in FIG. 1. System 100 includes electronic device 102, which may be implemented as, but is not limited to, a cell phone, a smartphone, a tablet computer, and a laptop computer. System 100 may include any number of electronic devices. For example, system 100 also includes cell phone 130 and tablet computer 140. Although various components of electronic device 102 are described below, it should be appreciated that other devices in system 100 including cell phone 130 and/or tablet computer 140 may include at least some components that are similar these described in connection with electronic device 102.

Electronic device 102 may be configured to receive input from a user to perform one or more functions. To receive user input, electronic device 102 may include input interface 104 including, but not limited to, a keyboard interface (e.g., a QWERTY keyboard), a touchscreen interface, and a speech interface such as a microphone. In embodiments that include a speech interface, the received speech input may be sent to an automatic speech recognition (ASR) engine (not shown) to recognize the content of the received speech input. The ASR engine may be included as a portion of electronic device 102 and/or the ASR engine may be located remotely from electronic device 102 and may be in communication with electronic device 102 using any suitable communication mediums (e.g., one or more networks). In some embodiments, electronic device 102 may be associated with one or more local ASR engines and one or more remotely located ASR engines, whereby at least some received speech input is processed by the one or more local ASR engine(s) and at least some received speech input is processed by the one or more remotely-located ASR engines. Examples of such distributed ASR systems are known by those of skill in the art. Speech input sent to the one or more remote ASR engine(s) for recognition using one or more communication medium(s) (e.g., one or more networks) connecting the electronic device 102 and the ASR engine(s) may be returned to the electronic device 102 from the remotely-located ASR engine(s) using the same or different communication medium(s).

In some embodiments, the ASR engine(s) may be configured to recognize speech input using one or more fixed or dynamically-generated grammars and/or vocabularies. Alternatively, some embodiments may allow free-form input to enable the user to speak to the virtual agent in a more natural way and the ASR engine may recognize whatever the user is saying using, for example, a natural language understanding (NLU) model. In embodiments that include speech recognition based on an NLU model, the virtual agent may attempt to infer an action the user wants to perform based on the NLU result. It should be appreciated that the particular manner in which recognition of speech input is implemented does not limit embodiments of the invention as any suitable speech recognition implementation may be used.

Electronic device 102 also includes a user interface 106 to enable the user to interact with the device to perform various actions. For example, in some embodiments, user interface 106 may display a plurality of icons associated with a plurality of applications and the user may interact with one or more of the icons to launch the associated application. Any suitable user interface may be used as embodiments of the invention are not limited in this respect.

Electronic device 102 may include one or more applications 108 configured to execute on the device. Some applications may be local applications that execute primarily on the electronic device 102. For example, a scheduling application (e.g., calendar application) may execute on the electronic device to enable the user to store scheduling information about events and/or appointments. Data associated with such applications may be stored locally on electronic device or at least a portion of the data may be stored remotely, as discussed in more detail below. Other applications (e.g., web-based applications) may be configured to interact with one or more computers over one or more networks. For example, a web-based email application may be hosted by one or more web servers such that when a user wants to check email using the email application, a request will be sent from the electronic device to one or more remotely-located servers that host the email application.

In some embodiments, electronic device 102 may include a location sensor 110 configured to determine the location of the electronic device. For example, the location sensor may be a global positioning system (GPS) sensor configured to determine coordinates for the location of the device. Some embodiments may include an application that interacts with location sensor 110 to display the location of the electronic device 102 on a map. Location sensor 110 may be implemented in any suitable way and embodiments of the invention are not limited in this respect.

As discussed briefly above, electronic device 102 may store user data 112, which describes information that is specific to a particular user or electronic device. For example, user data 112 may include, but is not limited to, contact information, calendar information, user preferences information, behavioral history information, and location information. In some embodiments, user data 112 may also include media content information such as music or picture data associate with a particular user account or device. In some embodiments, at least some user data 112 may be stored remote from electronic device 102 in a location that is accessible to electronic device 102 via at least one network. For example, at least some user data 112 may be stored in network storage 150 accessible to electronic device 102 via network 160. Data stored remote from an electronic device is commonly referred to as data stored "in the cloud" and such data is often accessible from multiple devices by the same user. The particular manner in which user data 112 is stored is not a limiting aspect of embodiments of the invention as the user data 112 may be stored in any suitable location accessible to electronic device 102.

Electronic device 102 also includes communication interface 120 configured to send and receive communications to and from other electronic devices (e.g., cell phone 130 and tablet computer 140) and network storage 150 via network 160. Communications may be sent via network 160 using any suitable protocol and any suitable message format as embodiments of the invention are not limited by the particular network implementation details that are employed.

In some embodiments, electronic device 102 also includes virtual agent 114. A user can interact with virtual agent 114 to perform a range of functions such as controlling the electronic device (e.g., sending messages, placing calls, opening applications) or accessing content and applications (e.g., web searching, posting information on a website). In some embodiments, virtual agent 114 may be implemented as an application which communicates with other applications 108 and user data 112 to perform the functions described above, and other functions as described in more detail below. Not all devices in system 100 may be associated with virtual agents and embodiments of the invention are not limited in this respect. As discussed in further detail below, electronic devices that are not associated with virtual agents may receive communications in a conventional format (e.g., text messages, email, telephone calls, etc.), whereas electronic devices associated with virtual agents may be capable of taking advantage of increased communication functionality and an enhanced user experience in accordance with some embodiments of the invention.

A virtual agent may be associated with a particular user and/or device in any suitable way. In some embodiments, a virtual agent may be an application executing on a user's electronic device, as described above. In such embodiments, the virtual agent is associated with the user of the device on which the virtual agent is installed. In other embodiments, a virtual agent may not be installed on a user's electronic device, but may execute primarily on a computer at a remotely-located location accessible to the user's electronic device via one or more networks. In embodiments where the virtual agent is located remotely from the user's electronic device, the virtual agent may include at least one identifier identifying one or more electronic devices associated with the user and/or at least one identifier identifying the user. Based on these one or more identifiers, the virtual agent may be considered to be "associated with the user," as that term is used herein.

In some embodiments, virtual agent 114 may be configured to perform one or more actions based, at least in part, on user data such as contact information or scheduling information for a user. For example, rather than sending or receiving communications to other devices itself (e.g., like an email or text message application), a virtual agent may direct other applications to send one or more communications to another device on behalf of a user in response to interpreting user input or upon the occurrence of a condition associated with a task the virtual agent is configured to perform.

In some embodiments, to facilitate an interaction with user data, virtual agent 114 may be configured to aggregate user data for a particular user associated with the virtual agent. For example, scheduling information for a user may be present in multiple sources including a web-based calendar, a local application calendar, and a task list. Virtual agent 114 may be configured to aggregate the scheduling information across these multiple sources (and possibly others) and the aggregated user data may be stored for querying by the virtual agent. By aggregating user data from multiple sources, the virtual agent may be able to quickly determine a more comprehensive view of the user's user data without having to separately query different sources. It should be appreciated however, that not all embodiments require aggregation user data. Rather, in some embodiments, the virtual agent may query multiple sources during a particular task (e.g., managing scheduling information) assigned to the virtual agent. In yet other embodiments, only some user data may be aggregated while other user data is not aggregated. Additionally, user data other than scheduling data may alternatively be aggregated and scheduling data is provided merely as an example of the type of data that may be aggregated.

The user data may be aggregated and stored in any suitable way. For example, at least some aggregated user data may be stored locally on a user's electronic device and/or the aggregated user data may be stored, at least in part, on one or more network-connected datastores accessible to the user's virtual agent via one or more networks. In some embodiments, storage of user data "in the cloud" is preferred, as the user data may then be made accessible to multiple electronic devices used by the user and/or another user's virtual agent provided that the other user's virtual agent is given permission to access the user data. Data aggregated by a virtual agent for a particular user may be updated periodically and/or the user data may be updated in response to a user request. The particular manner in which the user data is updated is not a limitation of embodiments of the invention.

In some embodiments, a virtual agent associated with one user may invoke a communication session with a virtual agent associated with another user to perform one or more actions. The communication session between virtual agents may be invoked in response to user input to perform the one or more actions in the foreground and/or the communication session between virtual agents may be invoked automatically without user input to perform the one or more actions in the background, without user input. In the disclosure herein, the user associated with the virtual agent that invokes the communication session is called the "sender" and the user associated with the virtual agent that receives a communication from the sender's virtual agent is called the "receiver." Additionally, the electronic device of the sender is often referred to herein as the "sending device" and the electronic device of the receiver is often referred to herein as the "receiving device." It should be appreciated however, that any electronic device may send and receive communications and this terminology does not limit the functionality of any particular device.

Figure 2:
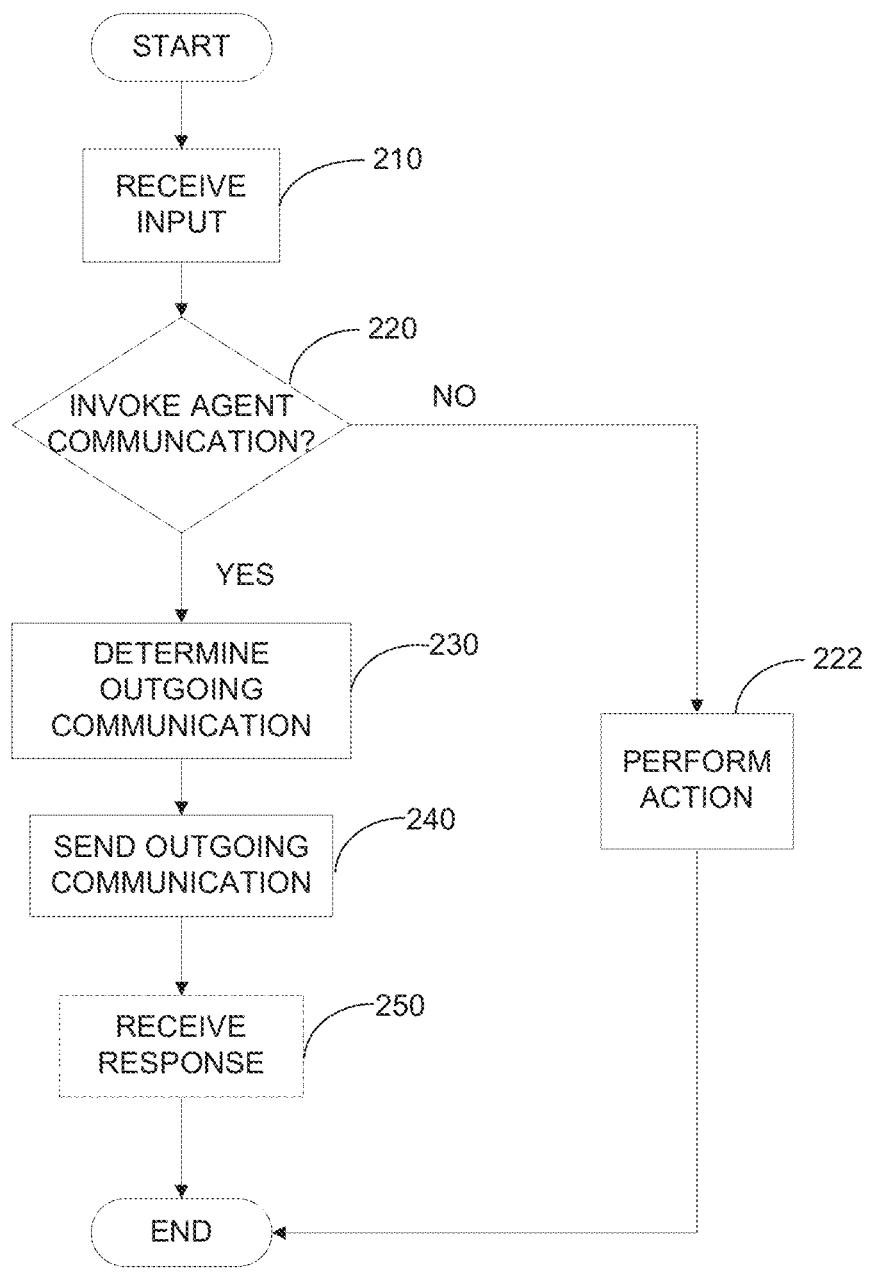
FIG. 2 shows an illustrative process for generating an outgoing communication from a virtual agent in response to user input in accordance with some embodiments of the invention.
Figure 3:
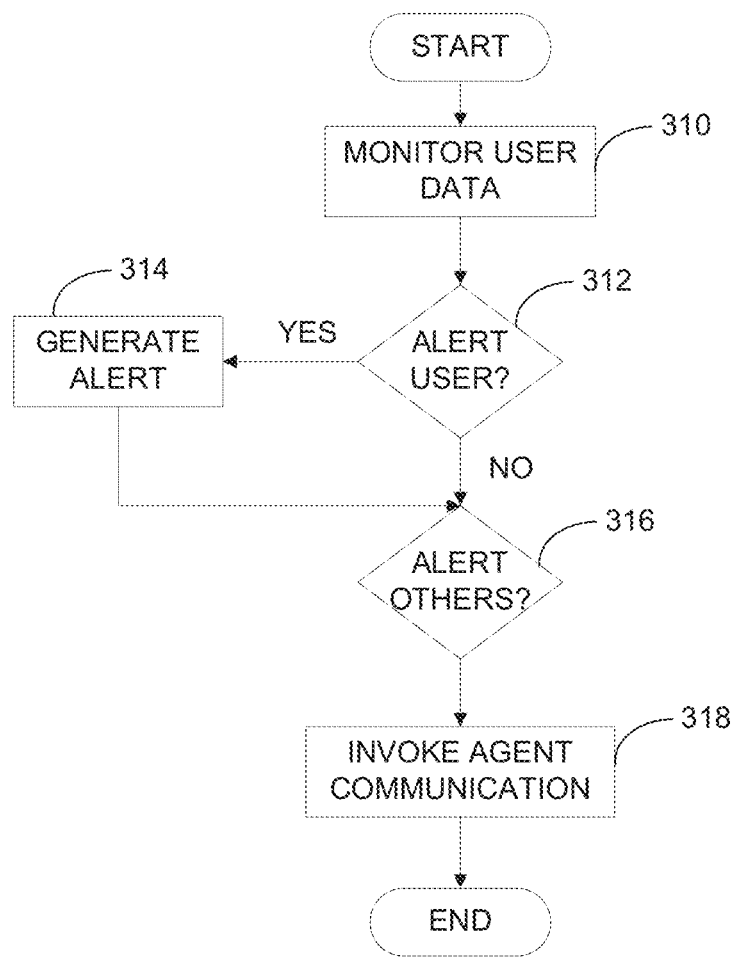
FIG. 3 shows an illustrative process for providing agent-to-agent communication in the background without requiring user interaction in accordance with some embodiments of the invention.

An exemplary process for invoking an agent communication session in response to user input is illustrated in FIG. 2. In act 210, user input is received from a user of an electronic device. As discussed above, in some embodiments that include a speech interface, the user input may include speech input that includes a request for the virtual agent to perform one or more actions that include participation by at least one other virtual agent for another user. For example, a user (i.e., a sender) may ask the virtual agent, "Where is John?" In response to this question, the virtual agent may determine that the sender would like information about a location of another user (i.e., the receiver) named John, and the virtual agent may interact with user data (e.g., stored contacts, scheduling information, etc.) in an attempt to determine contact information for the intended receiver user, John.

In response to receiving user input, the process proceeds to act 210 where it is determined whether a communication session with another virtual agent should be invoked. This determination may be based, at least in part, on the received user input and the determination may be made in any suitable way. In some embodiments, a determination of whether to communicate with another virtual agent is made by evaluating the content of the user input to identify one or more trigger terms for invoking a communication session with a virtual agent associated with another user. For example, trigger terms such as "where," "home," and "on my way," used in connection with a name of a person may indicate that the user's intent is to invoke a communication session related to location information. In response to receiving user input corresponding to the example discussed above (i.e., "Where is John"), the virtual agent for the sender may recognize the trigger term "where" followed by the name of a person "John" and may determine that the sender wants to know location information for John. The virtual agent may also incorporate other contextual data such as time of day, location, user history, or some combination to determine intent. If there are multiple listings for "John" within contacts, the agent may look to which "John" the user communicates with most regularly, or typically from that location or time of day. In another example, the sender may say "Tell John I'm on my way and I should be there in twenty minutes." In response to receiving this input, the virtual agent may identify the trigger term "on my way" used in connection with a user named John and may determine that the sender wants to inform John of the user's current location and an estimated time of arrival.

In some embodiments, information may be sent to an electronic device of a user (i.e., a receiver) by sending a message (e.g., a text message) that includes this information to the receiver's electronic device. For example, in the above example, if John is not associated with a virtual agent (e.g., because his electronic device does not include a virtual agent application), John's electronic device may receive a text message from the sender including the content "I'm on my way and he should be there in twenty minutes." However, if John's electronic device is associated with a virtual agent, the incoming communication may be interpreted by John's virtual agent to provide a richer user experience, as discussed in more detail below. Because the sender may not know a priori whether the receiver has a compatible virtual agent executing on the receiver's device, the sender's device may provide an outgoing communication to the receiver's device to determine if a second agent is present on the receiver's device before sending the message. Based on the response of the receiver's device, the first agent may interpret an appropriate type of message to send. If the receiver is not associated with a virtual agent, at least some of the content in a received communication from the sender may still be displayed on the receiver's device (e.g., as a text message). Accordingly, some embodiments of the invention allow for communications between electronic devices with or without virtual agents associated with the users of such devices, with users not associated with virtual agents receiving conventional-type messages (e.g., text message, instant message, email message, web-based application, etc.) and users associated with virtual agents receiving the content in a manner that may be interpreted by their virtual agents to provide a rich user experience, including providing responsive communication with the sender's virtual agent.

Although the above examples describe communications related to location information, other types of information may also be requested and/or shared using agent-to-agent communications in accordance with embodiments of the invention. For example, other types of information that may be requested or communicated include, but is not limited to, scheduling information, user content information (e.g., contact information or other user data), and any combination of location information, scheduling information, and user content information. In some embodiments, each type of information may be associated with trigger words recognized by the virtual agent to inform the virtual agent of the user's intent. For example, trigger terms such as "schedule," "when," and "available" when used in connection with a receiver user's name may indicate that the action to be performed relates to scheduling information and trigger terms such as "share" or "contact" may indicate that the action to be performed relates to requesting or providing user content information. It should be appreciated that these trigger terms are provided merely for exemplary purposes and any suitable terms, phrases, or contextual data (e.g., location, time of day behavior history, etc.) may be used by virtual agents in accordance with embodiments of the invention to determine the intent of the sender.

Returning to the process of FIG. 2, if it is determined in act 220 that the user does not intend to invoke a communication session with another virtual agent, the process proceeds to act 222 where an action is performed based on the user input. For example, if the user input is, "Where is the movie theater?" the user's virtual agent may determine that although the input includes the trigger term "where," the term "movie theater" does not refer to another user. Accordingly, the virtual agent may determine that a communication session with another virtual agent is not an appropriate action to perform, and instead the virtual agent may perform another action such as a web search for movie theaters near the location of the user, or some other suitable action.

If it is determined in act 220 that a communication session with a virtual agent for another user should be invoked, the process proceeds to act 230, where the content of an outgoing communication to the receiver's virtual agent is determined. The virtual agent may determine the content of the outgoing communication in any suitable way. In one example, if the user input is "Where is John?" the virtual agent may determine that the outgoing communication should include a request for the location of the receiver John, and this request may be sent to an electronic device using the virtual agent associated with John, as discussed in further detail below.

In some instances, the content of the an outgoing communication may include a request that includes more than one type of information. For example, if the user input is "When is John expected to arrive at the game?" the sender's virtual agent may understand that to determine an expected arrival time of John at the game, the sender's virtual agent will need to know the location of John, the location of "the game," and how long it will take John to travel between his current location and the location of the game based, for example, on John's current speed. In this example, the sender's virtual agent may attempt to determine the sender's intent by identifying what the user likely means by one or more terms in the user input. For example, the virtual agent may attempt to identify the intended receiver John by interacting with the sender's user data (e.g., the sender's contact information). If the virtual agent cannot identify the intended recipient, the virtual agent may prompt the user to provide more information. The virtual agent may also attempt to discover the intended meaning of "the game" based, at least in part, on the sender's user data. For example, the virtual agent may interact with the sender's scheduling information to determine whether there is a scheduled event corresponding to a type of game (e.g., a baseball game, a football game, etc.). Based on this investigation, the virtual agent may determine the identity of "the game" and the corresponding location of the game may also possibly be inferred by the virtual agent based on the information in the scheduled event.

In some embodiments, the sender's virtual agent may not be able to determine the meaning of certain terms in the user input, although a virtual agent for the receiver may be able to. In such instances, the outgoing communication may include an indication that the sender's virtual agent could not interpret certain terms, and a request to the receiver's virtual agent to see if the receiver's virtual agent could interpret those terms. In some embodiments, all user input may be transmitted to the receiver's virtual agent and the receiver's virtual agent may provide confirmation (e.g., based on the receiver's user data) of an interpretation of the sender's virtual agent. In other embodiments, only a portion of the user input may be transmitted to the receiver's virtual agent and embodiments of the invention are not limited by the amount of data communicated between virtual agents.

If contact information for the intended receiver is identified based on the sender's user data, the virtual agent may create an outgoing communication based, at least in part, on the identified contact information. In some embodiments, if the virtual agent does not uniquely identify an intended receiver from the sender's user data, the virtual agent may prompt the user to provide more information to resolve the ambiguity.

After determining suitable content to include in the outgoing communication, the process of FIG. 2 proceeds to act 240 where the outgoing communication is sent to the receiving user's electronic device. In some embodiments, user data may include preferences information for sending communications to one or more contacts in the user's contact list and the outgoing communication may be sent to the receiver's user device using the preferred communication method for that particular user. In the above example, the sender's user data may indicate that the sender generally prefers to send communications to the intended receiver "John" using text messaging. Accordingly, in response to determining that the intended receiver is John, the sender's virtual agent may create and send an outgoing communication as a text message to John's electronic device. Upon receiving the incoming text message, and provided the receiving electronic device is associated with a virtual agent, the virtual agent may interpret the information in the text message to perform at least one action, as discussed in more detail below. If John's device is not associated with a virtual agent, the device may display the incoming text message in a conventional format.

In some embodiments, a virtual agent may learn user preferences for a user associated with the virtual agent. A virtual agent may learn user preferences in any suitable way. For example, a virtual agent may learn user preferences by tracking one or more behavior variables indicating when a user prefers to send communications of a particular type. Behavioral variables that may be tracked for learning user preferences may include, but are not limited to, frequency of use, time of day, and day of the week. Additionally, user preferences may be specific to particular intended receivers. In some embodiments, user preferences may be stored as user data associated with a particular user, although the particular manner in which user preferences are stored is not a limiting aspect of embodiments of the invention.

After sending the outgoing communication in act 240, the process proceeds to act 250 where optionally a response communication is received by the sending electronic device from the electronic device to which the outgoing communication was sent. The response communication may include any suitable information corresponding to the outgoing communication sent to the receiving device. For example, the response communication may include a confirmation that the outgoing communication was received by the receiving electronic device. The response communication may also include information in response to one or more requests included in the outgoing communication (e.g., the location of the receiving user in response to a request for the receiving user's location). The response communication may also include one or more requests from the receiving user's virtual agent to provide additional information prior to performing the one or more actions specified in the request(s) in the outgoing communication. Communication may continue between the virtual agents for the sender and the receiver until the action(s) have been performed or one of the users has cancelled the communication.

Although communication between virtual agents may not require interaction from one or both of the users to perform an action (e.g., scheduling an appointment based on the users' calendars), in some embodiments one or both of the users may be prompted to confirm an action prior to actually performing the action. For example, providing information that may be considered private information (e.g., a user's location) may, in some embodiments, require user confirmation prior to providing the information to another user. Restrictions on sharing information between virtual assistants may be implemented in any suitable way and embodiments of the invention are not limited in this respect.

In some embodiments, one or more tasks may be delegated to a virtual agent such that communication between the virtual agent of one user and the virtual agent of one or more other users occurs in the background with or without intervening input from the users associated with the virtual agents. An exemplary process for managing a task without requiring user input to begin the process is illustrated in FIG.

3. In act 310 the agent monitors user data to determine whether a condition associated with the assigned task has occurred.

In one illustrative example, the task assigned to the virtual agent may be to manage a user's events and appointments included in scheduling information for the user, and the condition the virtual agent may be configured to monitor may be whether the user is likely to be late for a scheduled event. The virtual agent may make this determination in any suitable way. For example, the virtual agent associated with a first user may interact with user data for the first user to determine that the first user has a lunch meeting scheduled with a second user at 12:00 pm at a particular restaurant. The virtual agent may also determine the first user's location using, for example, a location sensor included in the first user's electronic device. As the time approaches for a scheduled event (e.g., 15 minutes before the scheduled event), the virtual agent may compare the location of the first user and the location of the restaurant to determine whether it is likely that the first user will arrive at the restaurant on time for the scheduled meeting. This determination may be made in any suitable way and embodiments of the invention are not limited in the particular way a virtual agent determines an estimated travel time between two locations.

In response to determining that a condition has occurred (e.g., determining that the user is unlikely to be available for a scheduled event), the process proceeds to act 312 where it is determined whether the user should be alerted to the occurrence of the condition. The determination of whether to alert the user may be made in any suitable way including basing the determination at least in part, on the type of task delegated to the virtual agent. In the example described above, when the virtual agent determines that the user is going to be late for a scheduled meeting, the virtual agent may alert the user that they are likely to be late to the meeting and the process proceeds to act 314 where the user may be prompted whether an outgoing communication should be sent to the second user's device to inform them that the first user will be late to the scheduled meeting. As described further below, other tasks delegated to a virtual agent may be performed without interaction or confirmation from the user and embodiments are not limited in this respect.

In response to the user responding to an alert in act 314 or if it is determined in act 312 that the type of task delegated to the virtual agent does not require a user alert, the process proceeds to act 316 where it is determined whether at least one other user should be alerted to the occurrence of the condition. If it is determined in act 316 that an outgoing communication should be send to at least one other user, the process proceeds to act 318 where a communication is sent to the at least one other agent.

In the example above, in response to determining that the first user will be late to the scheduled meeting, the virtual agent may send an outgoing communication to the electronic device of the second user to inform the second user that the first user will be late. In some embodiments, the outgoing communication may include other information as well, including, but not limited to, a current location of the first user, and information about an estimated time of arrival of the first user to the scheduled meeting. In some embodiments, the virtual agent of the first user and the virtual agent of the second user may continue to communicate information about the first user's location and/or the second user's location to provide one or more real-time updates of an estimated time of arrival of the users for the scheduled meeting. For example, if the virtual agent for the first user determines that the first user is likely to be thirty minutes late to the scheduled meeting, the first user's virtual agent may send a follow up communication to the virtual agent for the second user when the first user arrives at the scheduled meeting place and/or shortly before the first user is expected to arrive.

Once received, the virtual agent associated with the second user may interpret the information in the outgoing communication to alert the second user of the occurrence of the condition. As described above, the received communication may include additional information such as a link to a map application identifying the first user's current location. In response to receiving the communication from the first user, the second user's virtual agent may interpret the communication to display a map on the second user's electronic device showing the first user's current location and/or the estimated arrival time. As discussed above, if the second user's electronic device does not include a compatible virtual agent capable of interpreting the received communication to, for example, display a map of the first user's location, the second user may still be alerted using conventional communication applications such as text-based application (e.g., email or text messaging application).

In some embodiments, a virtual agent may be assigned a task to monitor an event that does not require alerting the user in response to the occurrence of a particular condition. When an electronic device for a user is put into a particular mode (e.g., silent mode or vibrate mode) or if the electronic device is turned off, a virtual agent associated with the user may be assigned the task of monitoring incoming communication to the device and sending a response communication to the sender of the incoming message that the user is currently unavailable. In some embodiments of the invention, the response communication may include additional information that may be interpreted by a virtual agent associated with the user who sent the incoming communication. For example, the response message may include information describing when the receiving user will be available or the response message may include information to send the communication using a different format (e.g., text message rather than telephone call).

In some embodiments, a virtual assistant may change the behavior of an electronic device based on interactions with the user data for the user of the electronic device. For example, the virtual assistant may determine based on the user's scheduling information that the user is scheduled to be in a meeting from 1-2 pm. When the virtual agent determines that the user is in the meeting (e.g., because it is 1 pm) the virtual agent may instruct the electronic device to automatically enter a silent or vibrate mode, thereby preventing the electronic device from disturbing others in the meeting. The virtual agent may also determine when the meeting has ended (e.g., because it is 2 pm) and the virtual agent may instruct the electronic device to exit silent/vibrate mode. In some embodiments, prior to exiting silent/vibrate mode, the user may be prompted to confirm whether exiting silent/vibrate mode is desired.

Figure 4:
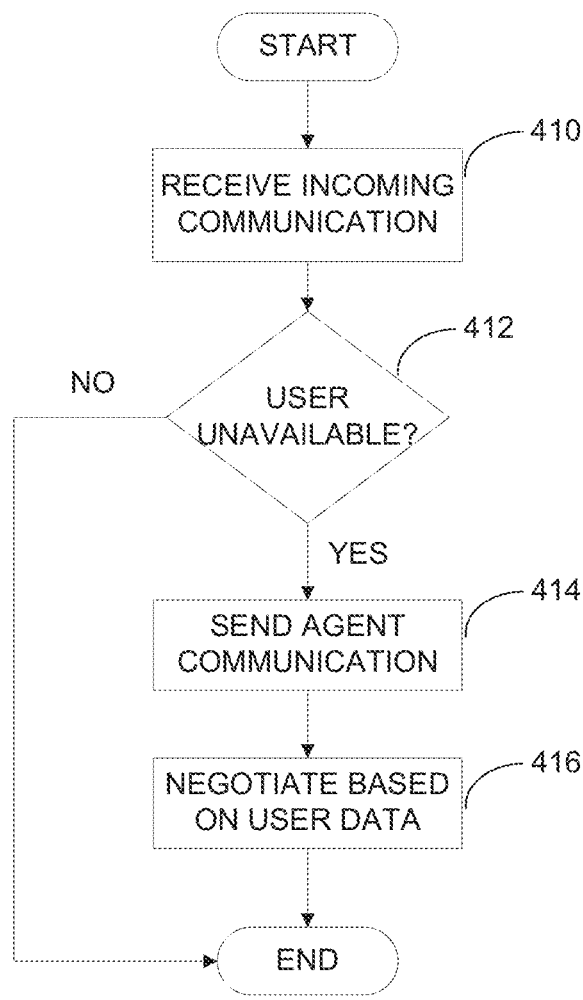
FIG. 4 shows an illustrative process for managing incoming communication by a virtual agent in accordance with some embodiments of the invention.

An exemplary process for monitoring incoming communication for an electronic device of a user in accordance with some embodiments of the invention is illustrated in FIG. 4. In act 410, an incoming communication, such as a text message or a telephone call, is received by an electronic device of a user. The process then proceeds to act 412 where it is determined by the virtual agent associated with the receiving electronic device whether the user is currently available. A determination of whether a user is currently available may be made in any suitable way. For example, if the electronic device is currently in a particular mode such as silent mode or vibrate mode, as discussed above, the virtual agent may determine that the user is unavailable and the process may proceed to act 414 where an outgoing communication is sent to the electronic device that sent the incoming communication.

Rather than just indicating that the user is unavailable, in some embodiments, the outgoing communication may include additional information to inform the user who sent the incoming message when the unavailable user may be available to communicate. For example, in response to determining that a user is unavailable to receive an incoming communication, the user's virtual agent may interact with user data (e.g., scheduling information) for the user to determine when the user will be next available to communicate. After consulting the user data, the virtual agent may include information in the outgoing message indicating one or more time preferences for rescheduling the communication. By proposing a time to reschedule the communication, the user who sent the incoming communication may be able to select a time that is convenient for both users. After the outgoing communication is sent, the process proceeds to act 316 where the virtual agents for the two users may send one or more further communications to negotiate a time that is mutually acceptable to both users based on their scheduling information.

In some embodiments, a user may configure a virtual agent to respond to certain incoming messages in a different way than other incoming messages. For example, if the incoming message is from a user that is recognized by the virtual agent as one of the receiving user's contacts, the virtual agent may be instructed to communicate with the sending user's virtual agent to reschedule the communication at a mutually acceptable time. However, if the incoming message is from a user that is not in the receiving user's contact the virtual agent may be instructed not to reschedule the communication. Preferences for modifying the communication behaviors of virtual agents in accordance with some embodiments may be implemented in any suitable way and embodiments of the invention are not limited in this respect.

Figure 5:
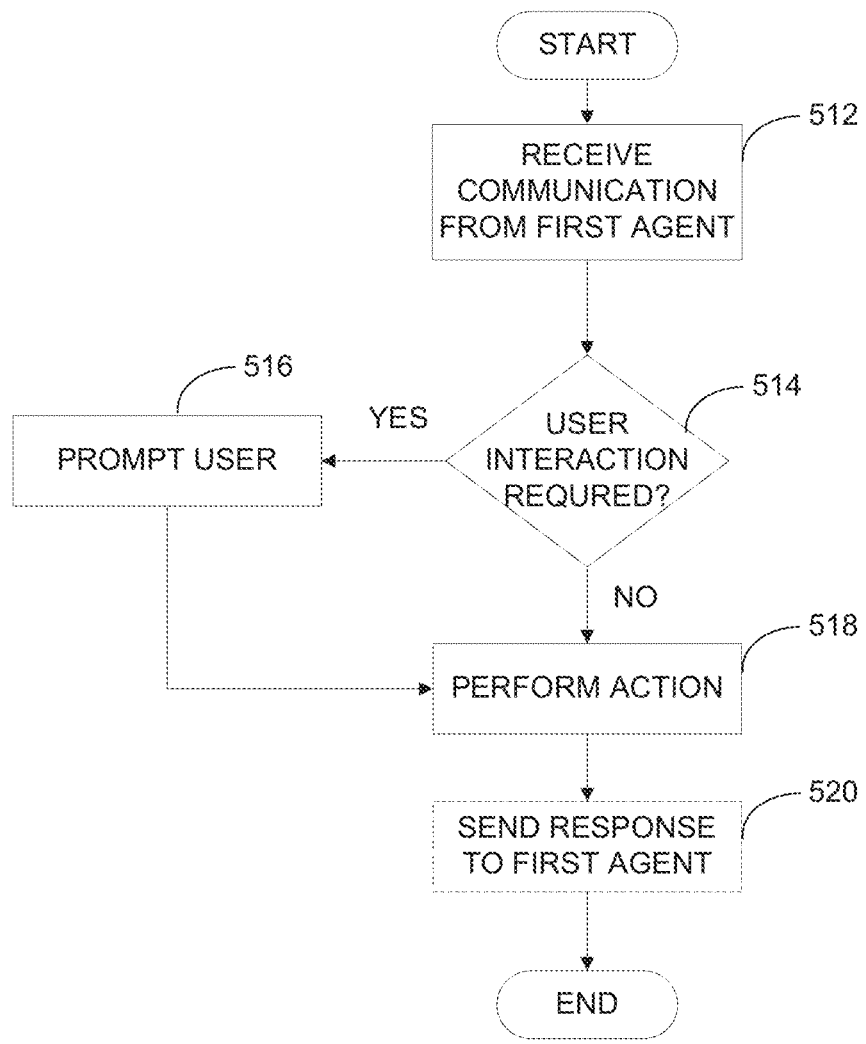
FIG. 5 shows an illustrative process for performing at least one action in response to receiving incoming communication from a virtual agent in accordance with some embodiments of the invention.

In some embodiments, when an electronic device receives an incoming communication from a virtual agent, a virtual agent associated with the user of the receiving device may interpret the information in the incoming communication to perform one or more actions. An exemplary process for processing an incoming communication received by an electronic device in accordance with some embodiments of the invention is illustrated in FIG. 5. In act 510, a communication from a virtual agent of a first user is received by an electronic device of a second user. The communication may be received in any format the electronic device is capable of receiving incoming communications. For example, the communication may formatted as, but is not limited to, a text-based message, an instant message, a telephone call, or a video chat session. If the receiving device is associated with a virtual agent, the virtual agent is configured to perform at least one action based, at least in part, on the content of the information in the received communication.

The virtual agent may interpret the received communication in any suitable way to determine the content of the communication and embodiments of the invention are not limited in this respect. For example, when the incoming message includes text, the virtual agent may determine whether any of the text corresponds to one or more trigger words that indicate the type of request included in the communication. The trigger words may be the same or different than the trigger words discussed above in connection with invoking an agent communication session and determining the content of an outgoing communication. By determining whether the incoming communication includes particular trigger words, the virtual agent may determine how to proceed with processing the request in the incoming communication. For example, if a trigger word related to location information is included in the incoming information, the virtual agent may perform one or more actions related to location-based requests, including, as described below, prompting the user for confirmation to share the user's location. Other types of requests include, but are not limited to, scheduling requests, user content exchange requests, and requests that include multiple types of information (e.g., location information and scheduling information).

It should be appreciated that identifying a type of incoming communication based on trigger words in the incoming communication is only one way a virtual agent may determine information about the type of content in an incoming communication and other ways are also contemplated. For example, in one implementation communications sent between virtual agents may be associated with metadata that provide an indication of the type of content in the communications and virtual agents may be able to determine the type of content based, at least in part, on the metadata associated with a communication.

In response to determining the content of the incoming communication, the process proceeds to act 514 where it is determined whether user interaction is required to act on one or more of the requests in the incoming communication. If it is determined that user interaction is required prior to acting on a request in the incoming communication, the process proceeds to act 516 where the user is prompted to provide user input to continue. An example where user input may be required is if the incoming communication includes a request for location information of a user. For example, if the incoming communication includes "where are you?" the virtual agent may determine that the user who sent the incoming message wants to know the receiving user's location. Some users may consider their location as private information that should not generally be shared with other users. Accordingly, in response to determining that the incoming communication includes a request for the user's location, the receiving user's virtual agent may display on a user interface of the electronic device an indication to the user that the sending user wants to know the receiving user's location and to confirm that this information may be shared with the sending user. Alternatively, or in addition to displaying a prompt on a user interface, the electronic device may provide the prompt in some other form including speech output.

Incoming communication other than requests for location information may also require user interaction. For example, an incoming communication from a virtual agent from a user may include a request to add contact information to the receiving user's contacts and in response to determining that the request is to modify user data for the receiving user, the receiving user's virtual agent may prompt the user to indicate that the sending user would like to add contact information to the receiving user's contacts. In response to receiving the prompt, the receiving user may confirm or dismiss the request to add the contact information included in the incoming communication.

In some embodiments, a user may be able to set permission and privacy permissions that the user's virtual agent may consult to determine whether user interaction is required for particular types of requests and/or what information may be shared with particular users or all users who request the information. In some embodiments, at least some permission or privacy permissions may be set by an application designer for the virtual agent and the user may not be able to change these permissions. For example, the application designer for the virtual agent may determine that user prompts are always required for sharing location information, but permissions related to displaying user prompts for sharing user content data are user-configurable. It should be appreciated that these examples are provided merely for illustrative purposes and do not limit embodiments of the invention.

Returning to FIG. 5, if it is determined in act 514 that user interaction is not required or in response to receiving user input from a prompt presented in act 516, the process proceeds to act 518 where one or more actions are performed by the virtual agent to respond to the request(s) included in the incoming communication. For example, if the incoming communication included "Where are you?" and the receiving user has given permission to share the user's location, the virtual agent may query the location sensor of the electronic device to determine the location of the user. The process may then proceed to act 520 where a response communication is sent to the virtual agent that sent the incoming communication. In a request for a user's location, the response communication may include, for example, a link to a web page for a map application showing the receiving user's location. In response to receiving the response communication, the agent that issued the request for the location information may display on the requesting user's device, a map showing the location of the other user. This may be accomplished, for example, by the requesting user's virtual agent instructing a web browser application to navigate to the link in the response communication.

In some embodiments, the incoming communication may include multiple requests and the virtual agent of the receiving user may perform multiple actions in accordance with the requests. For example, the incoming communication may include, "Tell Dave that the meeting is going to be delayed and let me know when he reads it." In response to this incoming communication, the virtual agent of the receiving user (i.e., Dave) is instructed to perform two actions. The first action is to instruct the receiving user that a scheduled meeting will be delayed and the second action is to monitor the behavior of the receiving user to determine when the receiving user has read the message about the messaging being delayed. In response to determining that the receiving user has accessed the message, the receiving user's virtual agent may send a response message to the requesting virtual agent to fulfill the second request in the incoming communication. Accordingly, in this example, the virtual agent of a first user can control the behavior of virtual agent of a second user to perform an action (in this case, monitoring the receiving user's behavior) on behalf of the first user.

Another example of processing an incoming communication that includes multiple requests is an incoming communication such as "Has my wife left the office yet? Please let me know when she will be home and let me know when she is five minutes away." This incoming communication includes three actions that the virtual agent associated with the user's wife must perform. In response to receiving this incoming communication, the wife's virtual agent will determine the wife's location (e.g., by querying a location sensor on the wife's electronic device) to determine whether she is at a location corresponding to her office. Presuming that the user's wife agrees to share her location, the wife's virtual agent may inform the user's virtual agent that his wife has left the office and is on her way home. The user's virtual agent may then present this information on the user's electronic device. In some embodiments, this response message may also include information about the wife's current location that may be used by the user's virtual agent to display her location on a map.

The second action to perform is to estimate when the wife will arrive home. The wife's current location may also be used to determine an estimated time of arrival when she is expected home. This determination may be made in any suitable way and the determination may be made under the direction of the wife's virtual agent or the user's virtual agent. For example, the determination may include various factors including, but not limited to, how long it usually takes the wife to drive home from her current location, current traffic conditions, and the speed limit of the roads between the wife's current location and home.

The third action in the incoming communication is for the wife's virtual agent to notify the user's virtual agent when the wife is five minutes from home. In some embodiments, the wife's virtual agent may provide periodic updates to the user's virtual agent describing the wife's current location. In other embodiments, the wife's virtual agent may merely monitor the wife's progress and estimate when she is five minutes from home. When this condition is satisfied, the wife's virtual agent may then send a communication to the user's agent that she is almost home.

In some embodiments agent-to-agent communication in accordance with some embodiments of the invention may be used to facilitate tasks requiring coordination between multiple virtual agents for different users. For example, a user may want to have dinner with his friends Megan and Ben at a time that is convenient for all three users. Rather than communicating using individual requests to each of Megan and Ben, the user may instruct the user's virtual agent as follows: "Please schedule dinner with Megan and Ben if they are available for dinner Saturday evening." In response, the user's virtual agent may determine the contact information for Megan and Ben based on the user's contact information and send outgoing communications to the virtual agents for Megan and Ben to determine based, on each of their stored user data, if and when they would be available for dinner on Saturday evening. In the outgoing communication, the user's virtual agent may include one or more suggested times based on the user's scheduling information that the virtual agent may access prior to sending the outgoing communications. In response to sending the outgoing communications to the virtual agents for Megan and Ben, the user's virtual agent may receive response communications from the virtual agents for Megan and Ben indicating their availability and the virtual agents may continue to negotiate a time that is mutually acceptable to all of the users. After an acceptable time has been determined, each of the users' virtual agents may update the corresponding user's scheduling information and send a notification to the users that the dinner has been scheduled.

As should be appreciated from the foregoing, embodiments of the invention that provide agent-to-agent communication in association with access to user data and permission and privacy preferences allows for functionality that conventional virtual agent implementations do not contemplate and typically cannot achieve. The examples provided herein are discussed merely as examples of functionality provided by embodiments of the invention and any other functionality that may benefit from coordination between at least two virtual agents are also possible.

Figure 6:
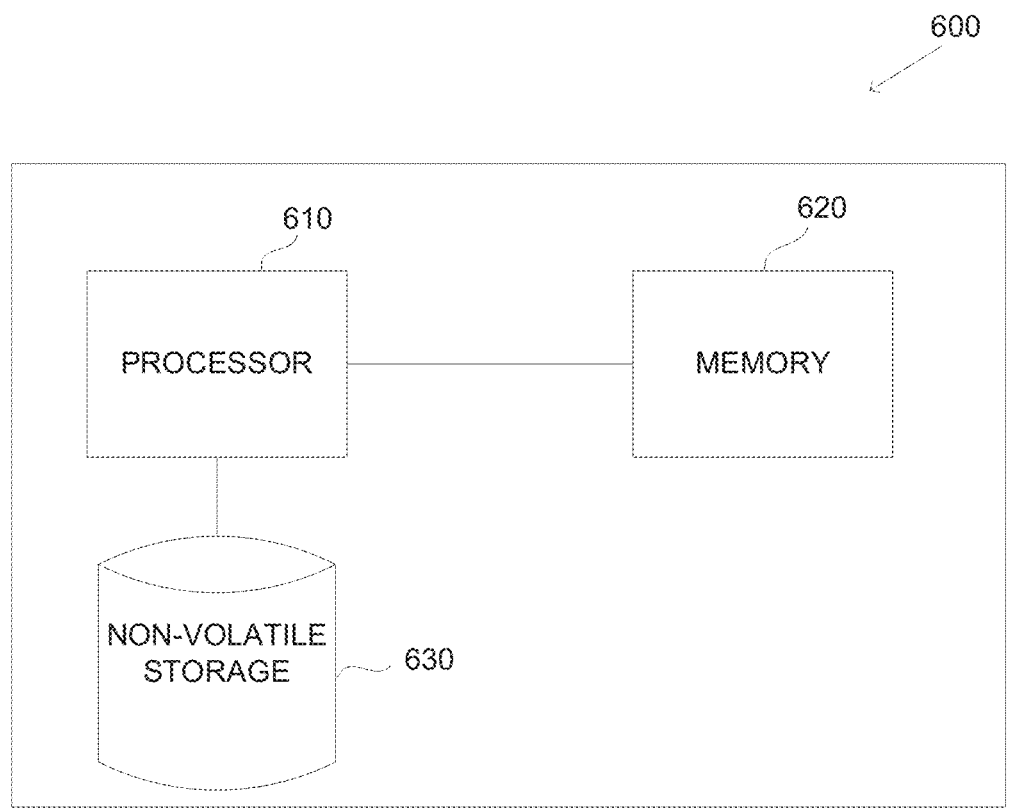
FIG. 6 is an illustrative computer system that may be used in connection with some embodiments of the invention.

An illustrative implementation of a client computer system 600 that may be used in connection with any of the embodiments of the invention described herein is shown in FIG. 6. The computer system 600 may include one or more processors 610 and one or more computer-readable non-transitory storage media (e.g., memory 620 and one or more non-volatile storage media 630). The processor 610 may control writing data to and reading data from the memory 620 and the non-volatile storage device 630 in any suitable manner, as the aspects of the present invention described herein are not limited in this respect. To perform any of the functionality described herein, the processor 610 may execute one or more instructions stored in one or more computer-readable storage media (e.g., the memory 620), which may serve as non-transitory computer-readable storage media storing instructions for execution by the processor 610.

It should be appreciated that client computer 600 is not limited by any particular type of computer and may include, but is not limited to, a handheld computer, a laptop computer, a tablet computer, a desktop computer, a smartphone, and any other type of computing device capable of rendering a web application in a web browser.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one non-transitory computer-readable storage medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of communicating using a virtual agent included on an electronic device, comprising:
   receiving, from the electronic device, an incoming communication triggered by the virtual agent included on the electronic device, the incoming communication including a request to share, with a second user, user information of a first user;
   determining, based on privacy information associated with the first user and based on an identity of the second user, whether the user information of the first user is shareable with the second user; and
   in response to determining that the user information of the first user is shareable with the second user, triggering output to the electronic device of an outgoing communication related to the user information of the first user.

2. The method of claim 1, wherein the user information of the first user comprises location information of the first user.

3. The method of claim 2, further comprising querying a location sensor to obtain the location information of the first user.

4. The method of claim 1, wherein the user information of the first user comprises calendar information of the first user.

5. The method of claim 1, wherein triggering output to the electronic device of the outgoing communication in response to determining that the user information of the first user is shareable with the second user comprises, in response to determining that the user information of the first user is not subject to a sharing restriction, sharing with the second user the user information of the first user.

6. The method of claim 1, wherein determining, based on the privacy information associated with the first user, whether the user information of the first user is shareable with the second user comprises prompting the first user for the privacy information associated with the first user.

7. The method of claim 6, further comprising:

storing the privacy information associated with the first user;

receiving a subsequent incoming communication including a subsequent request to share the user information of the first user with a user other than the first user; and determining, based on the privacy information associated with the first user and without prompting the first user for the privacy information associated with the first user, whether the user information of the first user is shareable with the user other than the first user.

8. At least one non-transitory computer-readable storage medium encoded with a plurality of instructions that, when executed by at least one processor, perform a method of communicating using a virtual agent included on an electronic device, the method comprising:

receiving, from the electronic device, an incoming communication triggered by the virtual agent included on the electronic device, the incoming communication including a request to share, with a second user, user information of a first user;

determining, based on privacy information associated with the first user and based on an identity of the second user, whether the user information of the first user is shareable with the second user; and in response to determining that the user information of the first user is shareable with the second user, triggering output to the electronic device of an outgoing communication related to the user information of the first user.

9. The at least one non-transitory computer-readable storage medium of claim 8, wherein the user information of the first user comprises location information of the first user.

10. The at least one non-transitory computer-readable storage medium of claim 9, wherein the method further comprises querying a location sensor to obtain the location information of the first user.

11. The at least one non-transitory computer-readable storage medium of claim 8, wherein the user information of the first user comprises calendar information of the first user.

12. The at least one non-transitory computer-readable storage medium of claim 8, wherein triggering output to the electronic device of the outgoing communication in response to determining that the user information of the first user is shareable with the second user comprises, in response to determining that the user information of the first user is not subject to a sharing restriction, sharing with the second user the user information of the first user.

13. The at least one non-transitory computer-readable storage medium of claim 8, wherein determining, based on the privacy information associated with the first user, whether the user information of the first user is shareable with the second user comprises prompting the first user for the privacy information associated with the first user.

14. The at least one non-transitory computer-readable storage medium of claim 13, wherein the method further comprises:

storing the privacy information associated with the first user;

receiving a subsequent incoming communication including a subsequent request to share the user information of the first user with a user other than the first user; and determining, based on the privacy information associated with the first user and without prompting the first user for the privacy information associated with the first user, whether the user information of the first user is shareable with the user other than the first user.

15. An electronic device comprising:

at least one processor; and at least one non-transitory computer-readable storage medium encoded with a plurality of instructions that, when executed by the at least one processor, perform a method of communicating using a virtual agent included on the electronic device, the method comprising:

receiving, by the virtual agent included on the electronic device, a free-form input from a first user;

interpreting the free-form input from the first user using a natural language understanding (NLU) model to recognize a request from the first user to share, with a second user, user information of the first user;

determining, based on privacy information associated with the first user, whether the user information of the first user is shareable with the second user; and in response to determining that the user information of the first user is shareable with the second user, triggering output from the electronic device of an outgoing communication related to sharing the user information of the first user with the second user.

16. The electronic device of claim 15, wherein the user information of the first user comprises location information of the first user.

17. The electronic device of claim 16, wherein the method further comprises querying a location sensor to obtain the location information of the first user.

18. The electronic device of claim 15, wherein triggering output from the electronic device of the outgoing communication in response to determining that the user information of the first user is shareable with the second user comprises, in response to determining that the user information of the first user is not subject to a sharing restriction, sharing with the second user the user information of the first user.

19. The electronic device of claim 15, wherein determining, based on the privacy information associated with the first user, whether the user information of the first user is shareable with the second user comprises prompting the first user for the privacy information associated with the first user.

20. The electronic device of claim 19, wherein the method further comprises:

storing the privacy information associated with the first user;

receiving, by the virtual agent included on the electronic device, a subsequent user input including a subsequent request to share the user information of the first user with a user other than the first user; and determining, based on the privacy information associated with the first user and without prompting the first user for the privacy information associated with the first user, whether the user information of the first user is shareable with the user other than the first user.

\* \* \* \* \*